F. P. KEELER.
TAG HOLDER.
APPLICATION FILED FEB. 2, 1912.
1,194,746.  Patented Aug. 15, 1916.
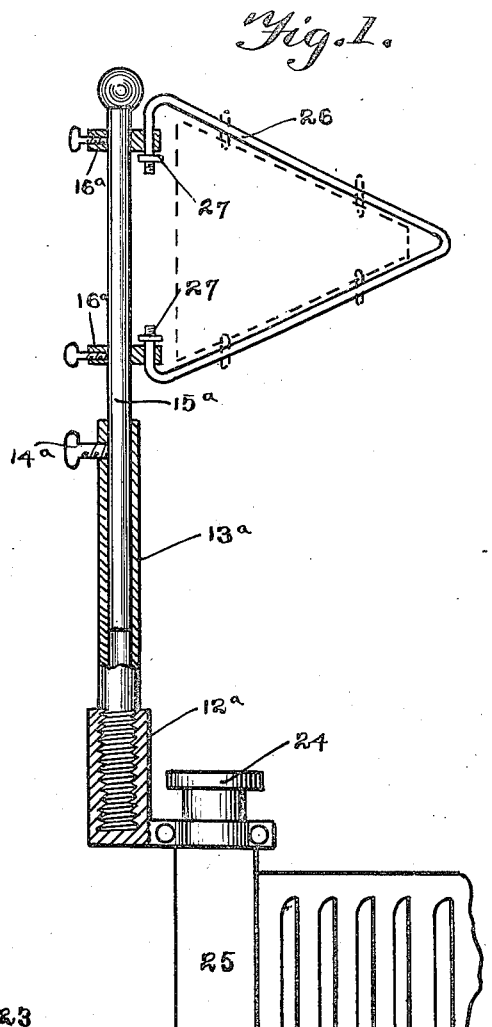
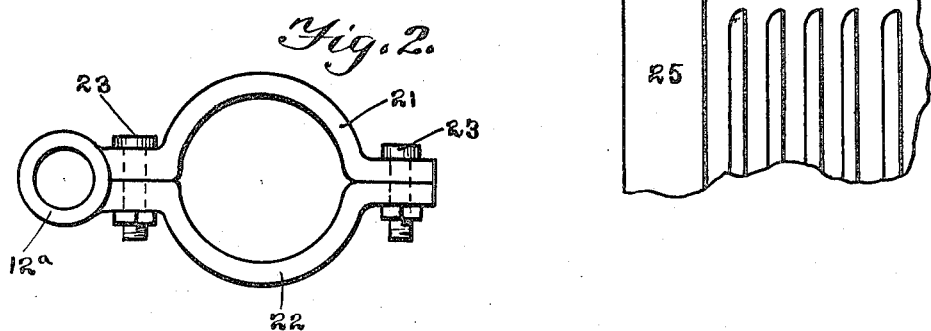
WITNESSES
INVENTOR
F. P. Keeler.
Attorney

UNITED STATES PATENT OFFICE.

FRANK P. KEELER, OF THERESA, NEW YORK.

TAG-HOLDER.

1,194,746.        Specification of Letters Patent.        Patented Aug. 15, 1916.

Application filed February 2, 1912. Serial No. 674,997.

*To all whom it may concern:*

Be it known that I, FRANK P. KEELER, a citizen of the United States, residing at Theresa, in the county of Jefferson and State of New York, have invented certain new and useful Improvements in Tag-Holders; and I do hereby declare the following to be a full, clear, and exact description of the invention, such as will enable others skilled in the art to which it appertains to make and use the same.

This invention relates to a new and useful improvement in brackets or holders, whereby the license tags may be secured to the rear or front ends of a vehicle.

Heretofore it has been customary to secure the license tags to automobiles particularly by means of hangers, whereby the tag was secured or hung to the rear axle of the machine. This exposes the tag to the dirt, in such a manner, that the numbers are often obliterated. By the use of the present invention a bracket is provided, whereby numbers may be interchangeably secured thereto in such a manner that the tag and number plate is supported in such a position that same will not accumulate dirt, dust, etc., created by the movement of the vehicle.

With the above and other objects in view, this invention consists in the construction, combination and arrangement of parts, all as hereinafter more fully described, claimed, and illustrated in the accompanying drawings. wherein:—

Figure 1 is a similar view, illustrating one form of mounting the device on the forward terminal of an automobile. Fig. 2 is a top plan view of the water inlet engaging clamp, utilized in securing the support or holder to the radiator of an automobile.

Referring in detail to the drawing, 12ª indicates an internally threaded socket provided with a rigid stationary clamping member 21. A removable clamping member 22, coöperates with the clamping member 21, through the instrumentality of the bolts 23, said clamping members being provided with complemental depressions for the engagement of the water inlet of the radiator 25, in automobiles. The socket 12ª has a tube 13ª threaded therein, said tubular member being pierced by a set screw 14ª, which provides a means for retaining the rod 15ª, mounted for reciprocation in the tube 13ª, in various positions.

The upper terminal of the rod 15ª, has mounted thereon for reciprocation, a pair of brackets 16ª. These brackets in combination carry a flexible V-shaped rod 26, to which the license plate is secured, by any suitable means. The terminals of the rod 26 are bent inwardly and pierce vertical openings, formed in the bracket 16, being retained in said openings by means of nuts 27.

Having thus fully described my invention, what I claim as new and desire to secure by United States Letters Patent, is:—

The combination with a support adapted to be carried by the radiator of an automobile, of a rod mounted in the support, a pair of brackets slidably mounted on said rod, means extending transversely through said brackets and engaging said rod for holding the brackets at spaced distance apart, each of said brackets provided with a vertical opening and said openings alining with one another, a flexible V-shaped rod having its ends bent angularly and extending toward one another and received within the openings of the brackets providing an adjustable support to receive license tags of various sizes, a nut carried by the ends of said angular rod to hold the ends of said angular rod within the openings.

In testimony whereof I affix my signature in presence of two witnesses.

FRANK P. KEELER.

Witnesses:
 JOHN JOLLY,
 ALVA E. STEACY.